United States Patent [19]

Schijve et al.

[11] Patent Number: 4,489,123
[45] Date of Patent: Dec. 18, 1984

[54] LAMINATE OF METAL SHEET MATERIAL AND THREADS BONDED THERETO, AS WELL AS PROCESSES FOR THE MANUFACTURE THEREOF

[75] Inventors: Jacobus Schijve, Pijnacker; Laurens B. Vogelesang, Nieuwkoop, both of Netherlands; Roelof Marissen, Cologne, Fed. Rep. of Germany

[73] Assignee: Technische Hogeschool Delft, Delft, Netherlands

[21] Appl. No.: 338,036

[22] Filed: Jan. 8, 1982

[30] Foreign Application Priority Data

Jan. 9, 1981 [NL] Netherlands ............. 8100088

[51] Int. Cl.$^3$ ............................. B32B 15/08
[52] U.S. Cl. .......................... 428/213; 156/229; 156/285; 428/215; 428/216; 428/252; 428/294; 428/416; 428/418; 428/425.8; 428/458; 428/474.4; 428/902; 428/910
[58] Field of Search ........... 428/294, 416, 418, 425.8, 428/458, 902, 910, 252, 213, 215, 216, 474.4; 156/229, 285

[56] References Cited

U.S. PATENT DOCUMENTS 4,035,694  7/1977  Barton et al. ................. 361/400

FOREIGN PATENT DOCUMENTS 0013146  9/1980  European Pat. Off. .
635823  4/1950  United Kingdom .
1303301  1/1973  United Kingdom .

OTHER PUBLICATIONS

David K. Klapprott, et al., "Improved Fatigue Life Through High Modulus-fiber Reinforcement of Adhesives", National Sampe, Apr. 1975, pp. 563–581.

Primary Examiner—Marion E. McCamish
Attorney, Agent, or Firm—Stevens, Davis, Miller & Mosher

[57] ABSTRACT

The invention relates to a laminate composed of two, three, four or more metal sheets. The metal sheets, which may for instance be of an aluminum alloy, are bonded together by means of adhesive layers. In the adhesive layers there are embedded poly-paraphenylene terephthalamide or carbon threads having a high modulus of elasticity. In the unloaded state of the laminate in its entirety there is a compressive stress in the range of 0 to 200 or 300 N/mm$^2$ in each metal sheet and a tensile stress in each layer with threads. The material according to the invention is in the first place meant for use in the field of aircraft or spacecraft engineering. However, it also may with advantage find application in various other fields of engineering where high demands are made on static, dynamic fatigue properties and damage tolerance.

22 Claims, 11 Drawing Figures

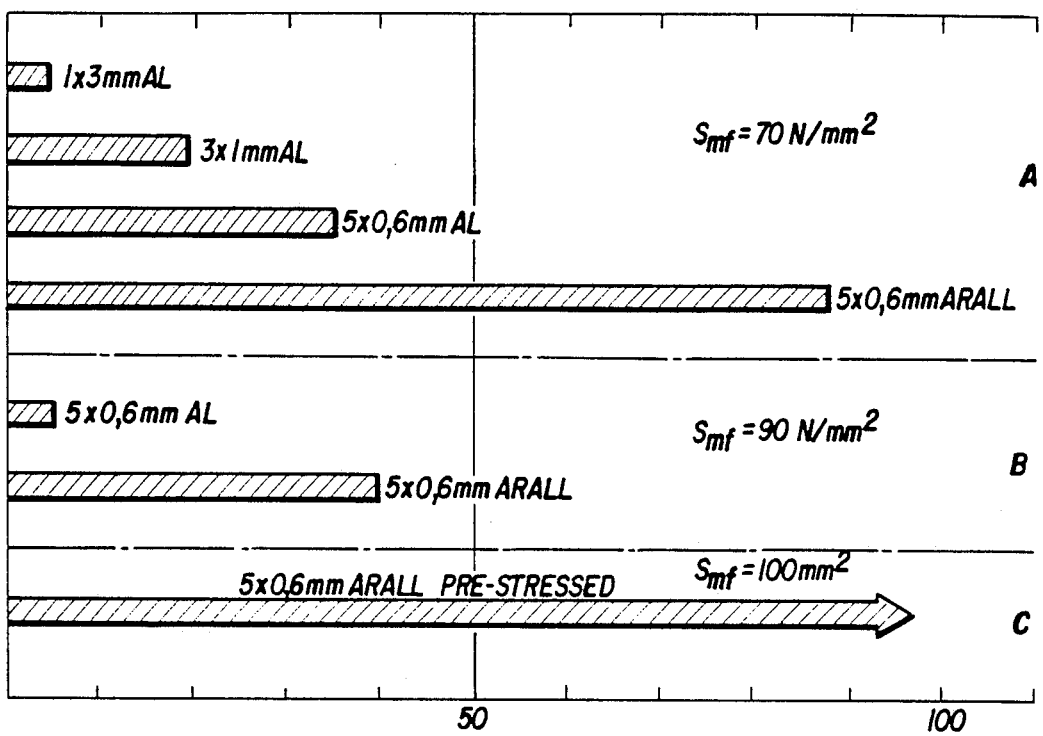
FIG. 8
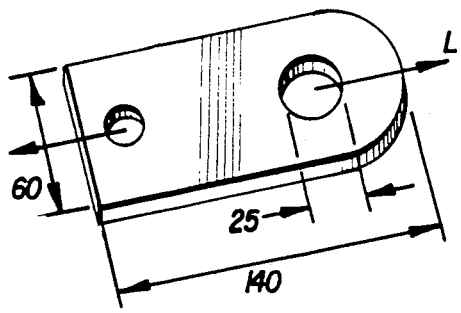
FIG. 9
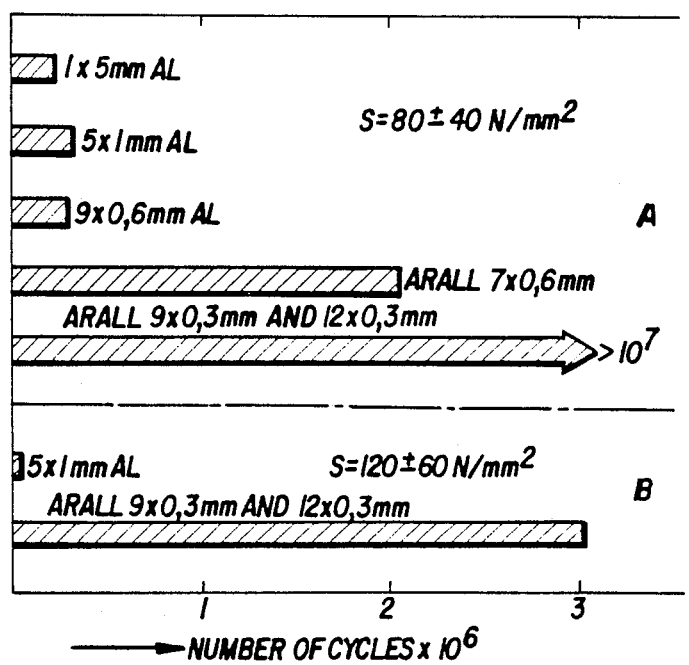

LAMINATE OF METAL SHEET MATERIAL AND THREADS BONDED THERETO, AS WELL AS PROCESSES FOR THE MANUFACTURE THEREOF

The present invention relates to a laminate composed of two or more metal sheets between which there are provided threads possessing a high modulus of elasticity, the metal sheets and the threads being bonded together by means of an adhesive, such as a metal glue.

A laminate of the general type indicted above may be considered to be more or less known from European Patent Application EP No. 001 3146. However, the laminate described in this reference is of the metal-thermoplastic-metal type, which is limited to a structure consisting of two very thin sheets between which there is provided an adhesive in the form of a thermoplastic material. On page 47 of the European patent application, it is disclosed that the thermoplastic material may contain modifying agents in the form of glass fibers and other high modulus, high performance fibers, such as graphite, boron, steel, aromatic polyamide fibers, potassium titanate whiskers and the like. Because of the presence of only two very thin metal sheets having a thickness generally in the range of 0.0127–0.254 mm and a thermoplastic adhesive, this laminate is destined for uses which require considerable and ready deformation; one such use is as panels for automobile bodies. A disadvantage of the thermoplastic adhesive is that this known laminate does not lend itself very well for use at rather high temperatures. Moreover, the fibers present in the thermoplastic material will not provide an optimum contribution to the strength of the laminate. Further, the fibers contained in the thermoplastic material of this known laminate are to be present in the form of short, discontinuous fibers in order to permit the required high deformation of the laminate which, however, has a limiting effect on improvement of the mechanical properties of the laminate brought about by use of the fibers. Except for some instances in which these laminates are reasonably effective, these known laminates call for further optimization. More particularly, these known laminates are not suitable for use as primary load bearing, rigid structural aircraft components. Moreover, these laminates do not meet the high demands made of late in air and space craft engineering, especially as far as weight saving is concerned with a view to the highly increased price of fuel.

The present invention has for its object to provide a laminate of the type indicated above which is more capable of satisfying present requirements. The laminate is characterized according to the invention in that in the unloaded state of the laminate in its entirety there is a compressive stress in each metal sheet and a tensile stress in each layer with threads, said compressive stress having a value in the range of from 0 to 300 $N/mm^2$, more particularly 0 to 200 $N/mm^2$. Thus there is obtained a pre-stressed laminate which is very effectively capable of taking up the frequently fluctuating loads in air craft structures. Notably, the fatigue properties of the pre-stressed laminate according to the invention are surprisingly favourable. As a result, the construction of the laminate according to the invention permits realizing a considerable saving on weight.

The laminate according to the invention is advantageously characterized in that the thickness of each metal sheet is smaller than 1 mm, and more particularly in the range of from 0.3 to 0.7 mm, for instance: 0.3 mm to 0.6 mm. Although the use in laminates of relatively thin metal sheets, more particularly sheets having a thickness of less than 1 mm, in itself leads to higher cost and was therefore not obvious, it has surprisingly been found according to the invention that the use of these very thin metal sheets leads to a considerable improvement of the properties of laminates.

The laminate according to the invention is with advantage characterized in that the metal sheets are formed of a material having a tensile strength higher than 350 $N/mm^2$. By preference, the metal sheets in the laminate according to the invention are of an aluminum-copper alloy, more particularly of the type AA(USA) No. 2024-$T_3$, or an aluminumzinc alloy, more particularly of the type AA(USA) No. 7075-$T_6$. Alternatively, the metal sheets in the laminate according to the invention may be of a titanium alloy or of steel or some other useful structural metals.

The laminate according to the invention is further characterized in that the reinforcing threads in the adhesive layers are formed of a material whose modulus of elasticity is higher than $5 \times 10^4$ $N/mm^2$ and not higher than $25 \times 10^4$ $N/mm^2$, it being preferred to use threads having a modulus of elasticity in the range of from $10 \times 10^4$ to $15 \times 10^4$ $N/mm^2$, more particularly about $13 \times 10^4$ $N/mm^2$. The elastic modulus envisaged here is determined in accordance with ASTM-D 2343. According to the invention, it is preferred that the adhesive between the successive metal sheets is a thermohardening substance.

Favourable results may be obtained if the laminate according to the invention is characterized in that the threads are of homo- or copolymers selected from the group comprising aramids, more particularly poly-para phenylene terephthalamide, or of aromatic polyamide hydrazides or fully aromatic polyesters. Also favourable results are to be expected according to the invention if the reinforcing threads in the adhesive layers are of carbon. Some of these materials and their properties are described in a paper by Kh. Hillermeyer and H. Weyland: "An aramide yarn or reinforcing plastics", Plastica, November 1977, No. 11, pp. 374 through 380.

A preferred embodiment of the laminate according to the invention is characterized in that the threads are provided in the form of one or more groups of yarns composed of endless filaments and arranged in long lengths parallel to one another. According to the invention, the threads may be provided in the form of a plain weave fabric having 7 to 11, preferably about 9, aramide warp yarns per cm, each having a linear density of decitex 1200–2000, preferably about decitex 1610, and 750 to 1250 filaments, preferably about 1000 filaments. The weft of the fabric may be made up of 5.5 aramide yarns per cm, each having a linear density of dtex 200 and 125 filaments.

A favourable embodiment of the laminate according to the invention is characterized in that the laminate is composed of three, four, five or more metal sheets between which there are provided threads having a high modulus of elasticity, and the metal sheets and the threads are bonded together by means of an adhesive, for instance a metal glue, the threads being contained in the adhesive layers in an amount from 20 to 30, up to 80, preferably about 45 to 50, or up to 55% by weight, calculated on the total weight of the adhesive and the threads.

The optimum number of metal sheets may be determined depending on the application envisaged and the requirements to be satisfied. Although there is generally no limit to the number of metal sheets to be used, the number of metal sheets will generally not be more than 25. By choosing the proper type of adhesive, which is preferably of a thermohardening substance, in combination with reinforcing threads of the proper material, a laminate is obtained, according to the invention, in which the thickness of each of the metal sheets is greater than the thickness of the individual, reinforced adhesive layers. Thin sheet material is to be preferred to thick sheet material because of its better static and dynamic properties. Thin sheet material is also to be preferred with a view to the occurrence of delamination during fatigue loading. Using a relatively great number of thin metal and threads-adhesive layers instead of a smaller number of relatively thick layers will cause the shear stress peak in the glue to be lowered and the chance of delamination will be reduced. If according to the invention the sheet thickness is optimized (optimum metal-threads ratio), said favourable results will be obtained.

The laminate according to the invention may be applied with particular advantage as a structural component in a vehicle or in a space- or aircraft, for instance as lower wing skin material, partly in order to obtain a saving on weight of the construction and partly with a view to safety as far as crack formation is concerned. The adhesives that may be used including a good metal glue, such as BSL 312 UL or FM-123-5 or FM 73 marketed by Ciba-Geigy or the glue types AF 126-2 and AF 162-3 marketed by 3M Company. However, other warm- or cold-curing metal glues may also be used. In the completed laminate according to the invention, the adhesive layer is formed of a thermohardening synthetic material on a basis of, for instance, epoxy resin. In contradistinction to a thermoplastic synthetic material, a thermohardening synthetic material will not turn plastic or melt at elevated temperatures.

BRIEF DESCRIPTION OF THE DRAWINGS

The preferred embodiments of the invention will now be described in greater detail, with reference being made to the accompanying drawings, in which:

FIG. 8 is a diagram showing the results of simulated flight tests wherein varying loads were applied to three different types of test specimens;

FIG. 9 is a perspective view of a laminate of the lug type, and a diagram showing the results of fatigue tests carried out on different laminate materials of this type;

DESCRIPTION OF THE PREFERRED EMBODIMENTS

Figure 1:
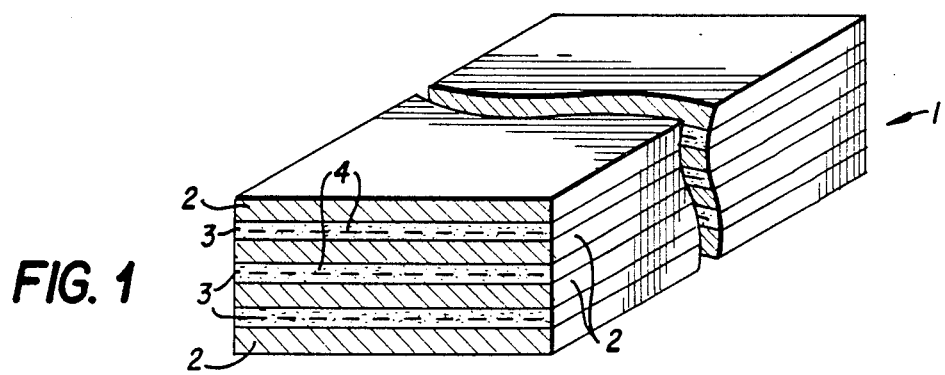
FIG. 1 is a perspective view of one embodiment of the laminate according to the present invention.
Figure 2:
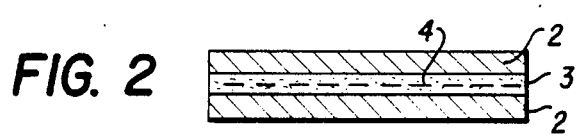
FIGS. 2–4 are cross-sectional views of three different embodiments of the laminate according to the present invention.
Figure 3:
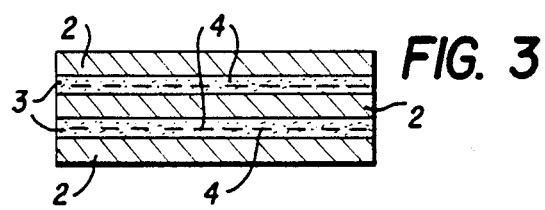
Figure 4:
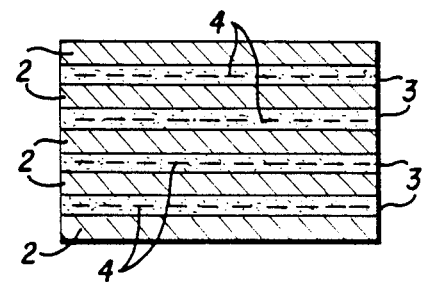

An example of a laminate according to the invention is schematically shown in perspective in FIG. 1. The laminate is generally referred to by the numeral 1 and is built up of four metal sheets 2 which are bonded together by means of interposed threads-adhesive layers 3, in which the threads are contained in the form of a fabric in which the warp is formed by the threads 4 having a high modulus of elasticity. The FIGS. 2, 3 and 4 schematically illustrate cross-sections of laminates according to the invention, viewed in a direction transverse to the warp threads 4 of the reinforcing fabrics. In FIGS. 1 through 4 corresponding parts are referred to by like numerals. The laminates illustrated are made up of different numbers of layers. The laminate according to FIG. 2 consists of two outer metal sheets 2, which are bonded together by means of the interposed threads-adhesive layer 3. The laminate according to FIG. 3 comprises three metal sheets 2, which are bonded together by means of two interposed threads-adhesive layers 3. The laminate according to FIG. 4 is built up of five metal sheets 2, which are bonded together by means of four threads-adhesive layers 3. The laminates according to FIGS. 1, 2, 3 and 4 are entirely symmetrical with a plane through the middle of the laminates and parallel to the plane of the metal sheets. In principle it is also possible to contruct laminates that are not symmetrical with a plane parallel to the metal sheets.

Figure 11:
FIG. 11 is a photograph of a highly magnified cross-sectional view of a laminate of the present invention.

The accompanying photograph is a highly magnified cross-sectional view (40x) in the direction perpendicular to the warp threads of a laminate of four metal sheets with three interposed threads-adhesive layers of the type according to FIG. 1. The laminate depicted in the photograph shown in FIG. 11 is made up of four metal sheets of an aluminum-copper alloy of the type AA(USA) No. 2024 frequently applied in aircraft building. The thickness of the metal sheets was 0.6 mm. The reinforced layer of adhesive between every two sheets is built up to two adhesive films of a good metal glue each having an initial thickness of 0.08 mm and a mass of 100 grams/m$^2$. Between these two glue films there is provided a fabric of aramid yarns of the type mentioned before, which fabric had a thickness of about 0.10 mm and a mass of 150 to 180 grams/m$^2$. The glue that was used was of the type that can be cured only upon its being heated to 120° C.

The procedure for making the laminate (shown in the photograph) was as follows. First, four identical metal sheets of said aluminum-copper alloy were superimposed on a movable support, with two films of adhesive containing an aramid fabric being placed between every two successive metal sheets. The resulting laminate of loose parallel parts, viz. four metal sheets and three layers of adhesive with reinforcing fabrics was covered with some thin plastics sheet material while it was still on the support. Subsequently, the wrapped up laminate of loose parts was compressed by creating a vacuum inside the wrapping of the laminate. Next, the wrapped laminate and its support were placed in an autoclave. After the autoclave had been closed, the laminate in it was subjected to an air pressure of 6 bar and the temperature was increased to 120° C. After a 30 minutes stay in the autoclave, the laminate was finished and it was removed from the autoclave. Before being bonded together with the adhesive layers, the metal sheets must, of course, be subjected to some appropriate pretreatments, such as alkaline degreasing, etching in a chromic-sulphuric acid bath, anodizing in chromic or sulphuric acid, applying a primer appropriate to the type of glue used, e.g. on a basis of epoxy phenol and having corrosion inhibiting properties, or the like.

A process according to the invention for making a pre-stressed laminate is characterized in that after the bonding operation an external tensile force is applied so that a specific elongation is imparted to the entire laminate which is greater than the specific elastic elongation of the metal sheets and smaller than the specific break elongation of the threads and of the metal sheets. According to the invention the application of the external tensile force will bring about plastic deformation of the metal sheets. The specific elongation brought about by the external tensile force is 0.2 to 1.8%, more particularly about 0.6%. A second, and particularly effective process according to the invention for the manufacture of a pre-stressed laminate is characterized in that prior to the curing of the layer of adhesive an external tensile force is applied only to the threads such that in the threads it will bring about a specific elastic elongation smaller than the breaking elongation, followed by the layer of adhesive being cured while maintaining the external tensile force, which tensile force is removed upon completion of the curing process, such that in the metal sheets of the completed laminate there prevails a compressive stress and in the threads a residual tensile stress. In the last-mentioned process for the manufacture of a pre-stressed laminate, the metal sheets need not be subjected to plastic deformation.

Figure 5:
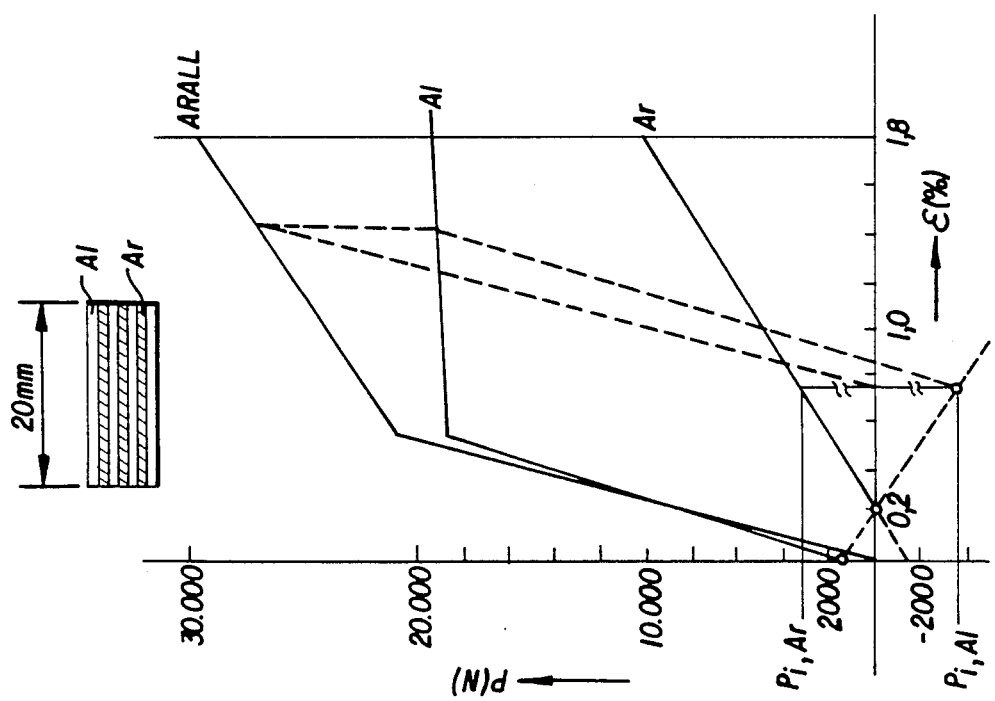
FIG. 5 is an illustrative diagram that helps to explain the method of manufacture utilized in the present invention.

FIG. 5 serves to illustrate and explain the process for the manufacture of a pre-stressed laminate by the method in which the metal sheets are subjected to plastic deformation. Also this example deals with a laminate of four metal sheets of said aluminum-copper alloy type A (USA) No. 2024, the sheets having a thickness of 0.6 mm. The four aluminum sheets (Al) are bonded together by way of three interposed threads-adhesive layers of a thermohardening metal glue which each contain an aramid fabric (Ar). The threads-adhesive layers each have a thickness of 0.25 mm. The laminate sample (ARALL) on which the measurements were conducted had a width of 20 mm. In FIG. 5 the % specific elongation is plotted as the abscissa against the tensile load P (expressed in newton) as the ordinate. For the three materials the specific elongation with increasing tensile force is indicated by the lines ARALL, Al and Ar. The ARALL line relates to the laminate in its entirety. The Al line relates to the behaviour of said aluminum alloy in itself. The Ar line relates to the behaviour of the threads-adhesive layer, i.e. an aramid fabric-containing adhesive layer. As the bond is brought about here under the influence of heat (120° C.), the Al and the Ar lines do not begin at the zero point because of the behaviour during cooling after the bonding process and the difference in coefficients of expansion between aluminum and aramid. FIG. 5 shows that a laminate (ARALL) is obtained which is unloaded in its entirety and has a compressive stress in the aluminum sheets (Al) in the order of, say, 88.5 N/mm² and a tensile stress in the adhesive-aramid layers (Ar) of identical magnitude. The laminate thus pre-stressed but unloaded in its entirety may be obtained by subjecting the laminate to such an external tensile force in the direction of the warp threads of the aramid fabric that the specific elongation is about 1.4%. FIG. 5 shows that upon the aluminum sheets being unloaded they display a specific plastic elongation of about 0.75%. Depending on the envisaged use of the laminate, the compressive stress desired in the metal sheets of the completed laminate can be pre-set in the manufacture thereof. For other kinds of metal and/or high-modulus reinforcing threads of materials other than aramids the magnitude of the compressive stress in the metal layers of the completed laminate may be imposed similarly. In FIG. 5 $P_{i,Al}$ and $P_{i,Ar}$ are the internal forces in, respectively, the aluminum sheets and the adhesive layers containing aramid threads, which forces are equal but of opposite sign. In the present case $P_{i,Al}$ corresponds to an internal stress of $-88.5$ N/mm² and the plastic elongation in the aluminum is 0.75%.

Figure 6:
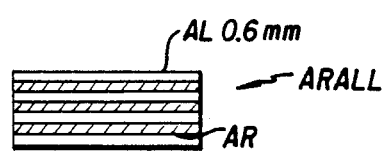
FIG. 6 is a diagram showing the results of tensile stress tests conducted on three different types of test specimens.
Figure 6:
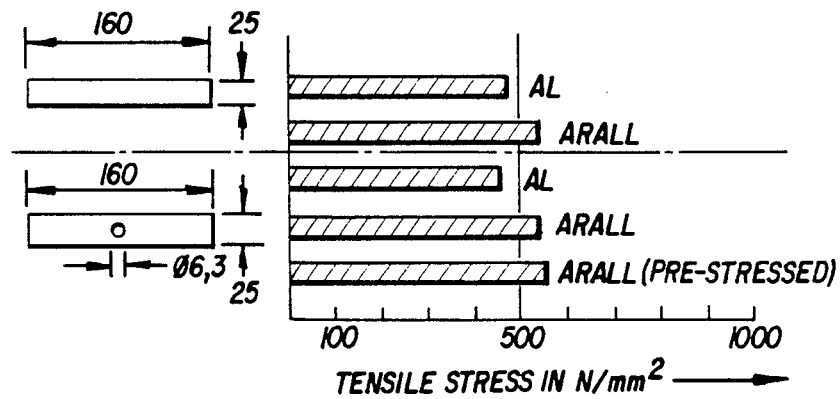

FIG. 6 shows the results of tensile tests applied to test specimens without a hole and to test specimens provided with a hole 6.3 mm in diameter. Also these tests were carried out on a laminate of the ARALL type according to the invention, which is built up of 4 metal layers of said aluminum-copper alloy of the type AA(USA) No. 2024 and of 3 aramide fabric-containing layers of adhesive. The tests were carried out on 3 different materials, viz. on test specimens of said solid aluminum-copper alloy denoted by Al, on test specimens of said non-pre-stressed laminate, denoted by ARALL, and on test specimens of the pre-stressed laminate referred to as ARALL (pre-stressed). From FIG. 6 it is apparent in the first place that the ARALL and the pre-stressed ARALL laminate have a tensile strength which is about 10 to 15% higher than that of solid aluminum (Al). Further, it is considered particularly favourable that in contrast to the situation with solid aluminum the tensile strength of pre-stressed ARALL is not reduced by the test specimen being provided with a hole.

Figure 7:
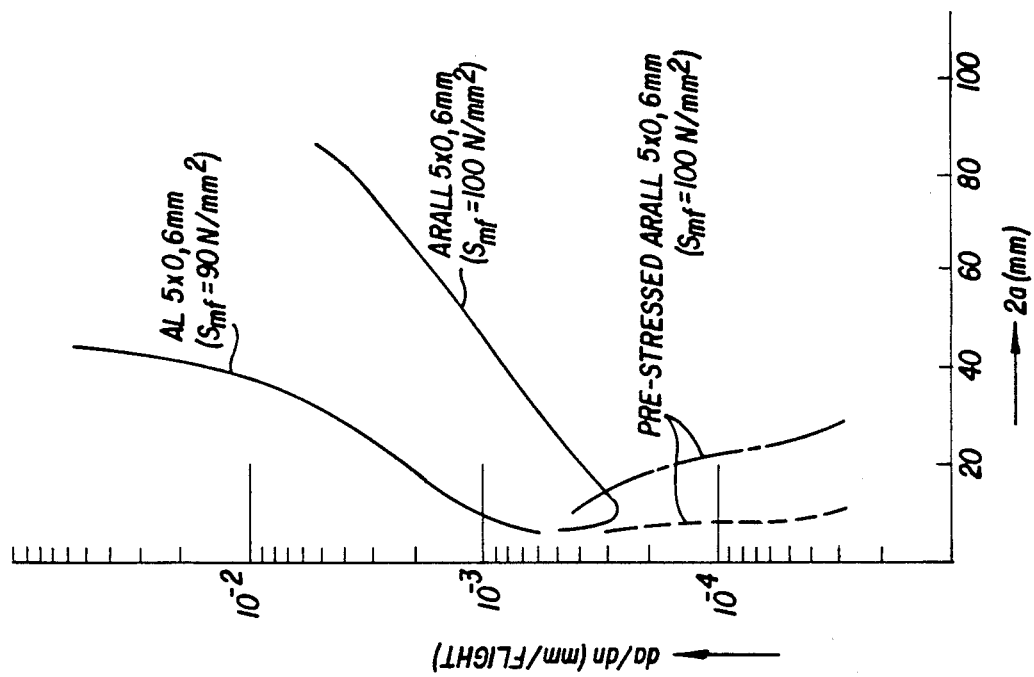
FIG. 7 is a diagram showing the results of simulated flight tests conducted on three different types of test specimens.

FIG. 7 shows the results of simulated flight tests commonly applied in aircraft engineering. The tests were carried out on three types of laminates. The first laminate consisted of five layers of metal sheets bonded together (referred to as Al), the metal being the aluminum-copper alloy of the type AA (USA) No. 2024, no threads being incorporated in the four layers of adhesive. The second layer was made up of five layers of interbonded aluminium sheet of the same alloy, an aramid fabric (referred to as ARALL) being incorporated in the layers of adhesive. The third laminate was of the same type as the second laminate, except that it was pre-stressed (referred to as pre-stressed ARALL). The test specimens measured 300 mm in length, 100 mm in width and 4 mm in total thickness. The full lines and the dash lines indicate the results obtained with test specimens which prior to the test were provided with a 7 mm saw cut. The dot-dash line indicates the results obtained with test specimens which prior to the test were provided in their centers with a circular hole 11 mm in diameter. FIG. 7 gives the results of fatigue tests conducted on three types of laminates, the test specimens being subjected to a varying load in accordance with a special flight simulation program. In FIG. 7 the crack length 2a in mm is plotted on the abscissa and the crack propagation rate da/dn in mm/flight on the ordinate. Comparing the Al line with the ARALL line shows that the crack propagation rate in the ARALL laminate is considerably lower than in the Al laminate. For the pre-stressed ARALL the results are even far more favourable, since in that case the crack propagation rate decreases to almost zero. Also when the tests with pre-stressed ARALL were carried out on a somewhat different test specimen, namely one with a large hole in its center, the results turned out particularly favourable, as is apparent from the trend of the dash line. In FIG. 7 $S_{mF}$ indicates the mean stress in the test specimen during the simulated flight.

Also FIG. 8 gives the results of experiments using varying loads in accordance with a simulated flight test program practiced in aircraft engineering. All tests were carried out on specimens of 300×100 mm, 3–4 mm thick and provided with a 3 mm saw cut in their middle. The tests were carried out on five different kinds of material, viz. in the first place solid aluminum having a thickness of 3 mm (1×3 mm Al), in the second place an aluminum laminate of three metal sheets having a thickness of 1 mm, without threads being contained in the adhesive (3×1 mm Al), in the third place an aluminum laminate of five metal sheets having a thickness of 0.6 mm, without threads being contained in the layers of adhesive (5×0.6 mm Al), in the fourth place a laminate of five aluminum sheets having a thickness of 0.6 mm and a reinforcing fabric of aramid threads contained in the layers of adhesive (5×0.6 mm ARALL) and in the fifth place a laminate of the last-mentioned type which is pre-stressed (5×0.6 mm ARALL pre-stressed). The aluminum is again formed by the aluminum-copper alloy of the type AA (USA) No. 2024. FIG. 8 gives for the various materials the number of simulated flights after which the test specimens ruptured. In the rectangles A, B and C are the results of the tests in which a progressively increasing mean load was applied to the test specimens, viz. $S_{mF}$=70, 90 and 100 N/mm², respectively. Already from rectangle A in FIG. 8 it is apparent that the behaviour of the ARALL material comprising metal sheets 0.6 mm thick, i.e. a thickness well below 1 mm, is particularly favourable. The results mentioned in the rectangle B of tests in which a higher mean load was applied confirm the favourable behaviour of the ARALL material. Finally, in rectangle C are the results of subjecting a test specimen of the pre-stressed ARALL laminate to an even higher load. It shows that even after as many as 100,000 simulated flights the pre-stressed ARALL laminate had not yet ruptured.

FIG. 9 gives the results of fatigue tests on specimens of the lug type, drawn at the top in FIG. 9, that had been subjected to a varying load at constant amplitude. The tests were carried out on various types of materials which are denoted in the same way as in FIG. 8. From the results mentioned in the rectangle A it appears that the ARALL laminate of metal sheets having a thickness of less than 1 mm possesses particularly favourable properties and that the results even improve with decreasing layer thickness of the metal sheets. In rectangle B of FIG. 9 are the test results obtained under a higher mean load, and in that case also, ARALL laminate exhibits a particularly favourable behaviour.

Figure 10:
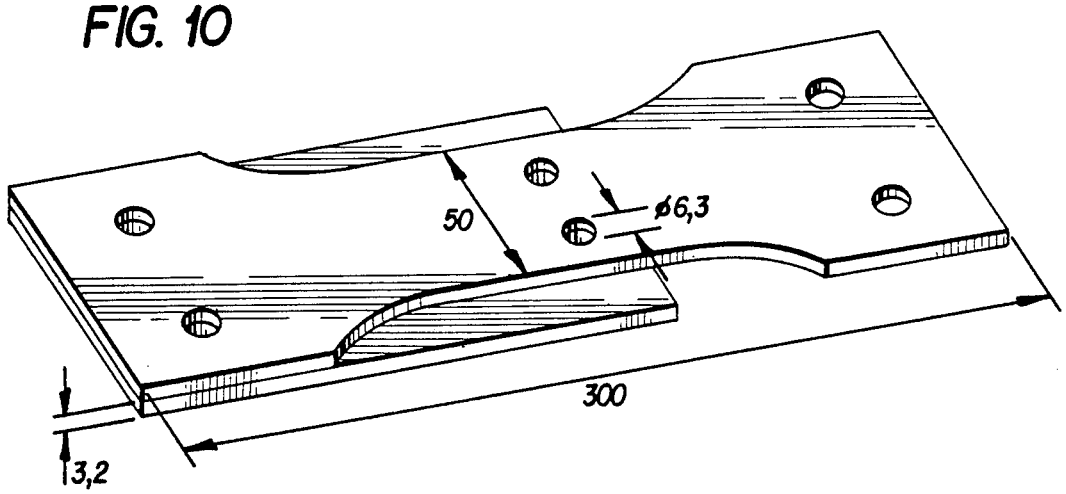
FIG. 10 is a perspective view of a laminate of the bolt-joint type, and a diagram showing the results of tests carried out on different laminate materials of this type.
Figure 10:
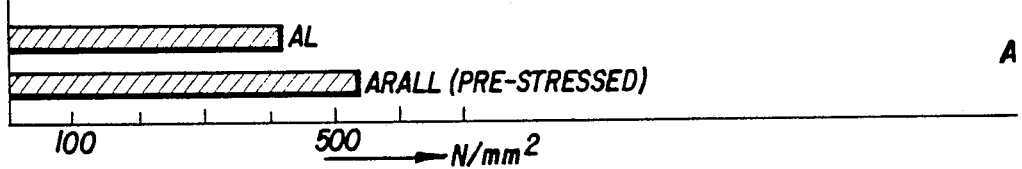
Figure 10:
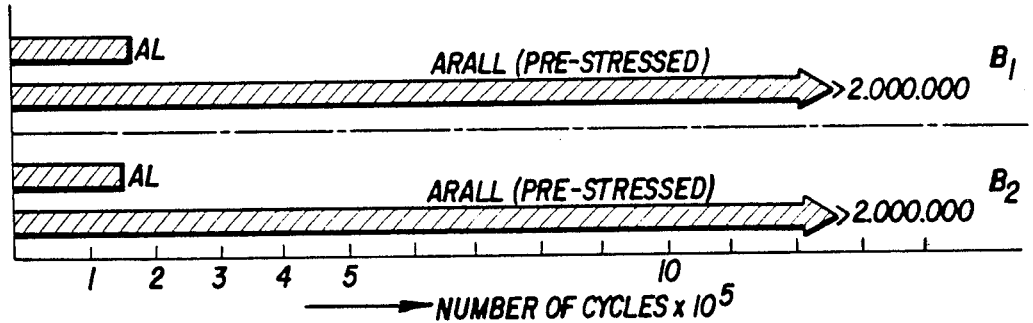
Figure 10:
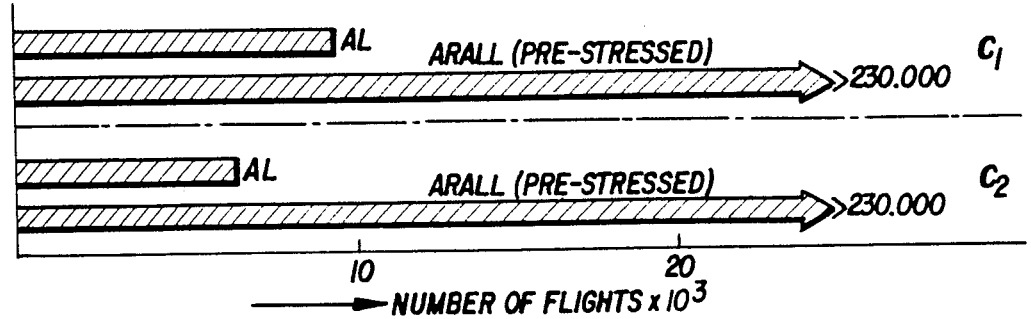

FIG. 10 shows the results of tests carried out on material of the bolt-joint type commonly used in aircraft engineering. A test specimen of this type is drawn in perspective in FIG. 10 at the top, provided with a bore 6.3 mm in diameter for accommodating a bolt. In rectangle A of FIG. 10 are the results of tensile tests, mentioning the tensile strength in N/mm². It shows that the pre-stressed ARALL laminate has a tensile strength which is about 22% higher than that of solid aluminum sheet material (Al). The aluminum sheets are of the same kinds of alloys as mentioned with reference to FIGS. 6–9. In the rectangles $B_1$ and $B_2$ of FIG. 10 are the results of tests using a varying tensile load at constant amplitude. They show that the test specimen of pre-stressed ARALL laminate may be subjected to a practically infinite number of loading cycles without being ruptured. Rectangle $B_2$ gives the results for test specimens which had previously been exposed for 6 weeks to a moist salt atmosphere. $B_1$ shows the results obtained with test specimens which had merely been exposed to the normal atmosphere. In the rectangles $C_1$ and $C_2$ of FIG. 10 are the results of tests in which the test specimens were subjected to a highly fluctuating load in accordance with a flight simulation program as used in aircraft engineering. These results also show that the pre-stressed ARALL laminate withstands a practically unlimited number of simulated flights. In rectangle $C_2$ are the results obtained with test specimens that had previously been exposed for 6 weeks to a damp salt atmosphere. Rectangle C gives the results obtained with test specimens that had merely been exposed to the normal atmosphere. Comparing the results of $C_1$ and $C_2$ shows that unlike the test specimens of solid aluminum the test specimens of pre-stressed ARALL laminate were not affected by the salt atmosphere.

The above-described test results mainly relate to laminates according to the invention, the metal sheets being of an aluminum-copper alloy which finds large scale application in aircraft engineering, the layers of adhesive containing a fabric of aramid threads. However, as mentioned before, according to the invention use may also be made with advantage of sheets of other structural metals. And depending on the use envisaged the layers of adhesive also may contain threads of different materials which also have a high modulus of elasticity. It should be noted, however, that the threads used must possess a low creep, as for instance Arenka 930, of which the creep properties are mentioned in said article in Plastica, November 1977, No. 11, pp. 374 through 380.

Within the scope of the invention various modifications may be made. Although in the laminates according to the invention it is preferred to apply metal sheets having the same thickness, it is also possible in principle that in one and the same laminate there may be contained metal sheets which have two or more different thicknesses and are arranged either symmetrically or unsymmetrically.

It is also possible in principle that in one and the same laminate there may be contained sheets of different metals or alloys. The laminates according to the invention may in principle be made in the form of sheet material having a width of, say, 1 m and a length of a few meters. Apart from being used in the field of aircraft and spacecraft engineering, the laminates according to the invention also may with advantage find application in various other fields of engineering, particularly those where high demands are made on static, dynamic (fatigue properties) and damage tolerance properties.

EP No. 0013,146 describes a laminate of the metal-thermoplastic-metal type, which is limited to a structure of two relatively thin sheets between which there is provided an adhesive in the form of a thermoplastic material.

DE Pat. No. 2,642,882 describes a kind of armour plate formed by a laminate. This known laminate consists of at least one steel sheet on which there are placed a number of sheets of a thermoplastic polyamide, between which there are fabrics of aramid fibres. This known laminate is of a type different from that according to the present application.

U.S. Pat. No. 4,035,694 describes a metal-clad dielectric sheeting useful in the manufacture of printed circuitry comprising an electrically conductive metallic layer adhered to a nonwoven web that comprises a unique fibre blend compacted and held together by a polymeric binder material. The fibre blend includes heat-resistant fibres, preferably aromatic polyamide fibres, and high-tensile-strength fibres that absorb little moisture. This known laminate is of a type which is totally different from that according to the present application. Notably, said known laminate is not designed for absorbing high mechanical loads, the fibres being present in the form of a nonwoven web.

FR Pat. No. 2,447,272 describes a specifically laminated upholstery panel for motor-cars. The panel consists of a laminate which is formed in the by a number of sheets of an aluminum alloy between which there are placed sheets of thermoplastic material, e.g. polyester. One side the laminate is also covered with several layers of a fabric made up of aramid fibres for absorbing shock loads. These known panels form a laminate of a type which is entirely different from that according to the present application, which is quite evident from the fact that the various layers are attached to each other by screws.

DE Pat. No. 2,916,299 describes a method of manufacturing a laminate made up of several layers of a low-melting metal having fibre-reinforced layers positioned between them.

On its outside the laminate is covered with layers of a material which has better thermal and mechanical properties than the low-melting metal layers. The method comprises a treatment at elevated temperature at which the low-melting metal penetrates into the fibrous fabric.

U.S. Pat. No. 3,189,054 mainly relates to a tubular laminate article comprising alternatively wound layers of metal, particularly aluminum, and thermoset resin impregnated unidirectional glass fibres. In this tubular structure obtained by filament winding the overlying layers each consist of wound strips and tapes. Each metal layer consists of a great many adjacent aluminum strips, the interpositioned layers being formed of a great many adjacent glass fibre tapes. Although this publication must therefore be considered to relate to laminates of a kind different from that according to the present application, U.S. Pat. No. 3,189,054 does mention that the layers of metal and glass fibres are prestressed.

GB Pat. No. 1,303,301 describes a method of manufacturing a composite material article in the form of a sheet sandwich structure of metal sheets having bonded between them a layer of fibrous reinforced plastics material. Particularly the fibrous material may comprise carbon fibres and/or glass fibres. In order that the fibres may be properly positioned in the completed laminate, said publication describes an apparatus with reference to FIGS. 3 and 4 by means of which some pull is applied to the fibres in order that they may neatly lie in a straight line in the completed laminate. This stretching and straightening of the fibres, however, does not at all lead to an end product that may be considered a pre-stressed laminate.

Since when this known laminate is unloaded in its entirety there will be no compressive stress in the metal sheets in combination with tensile stress in the fibres.

Also U.S. Pat. No. 4,029,838 and FR Pat. No. 2,322,190 describe composite laminate structures of metal sheets and various kinds of fibres.

GB Pat. No. 635,823 describes a laminate of metal sheets and a fibrous material, such as a paper fabric of a glass cloth impregnated with synthetic resin. It mentions the use of these known composite sheets for aircraft wings.

U.S. Pat. No. 3,321,019 describes a helicopter blade which is partially reinforced with a laminate of aluminum sheets and fibreglass cloth.

Reference is also made to an article by D. K. Klapprott, C. L. Mahone, T. F. Mika, P. M. Stifel and T. J. Apongi entitled "Improved Fatigue Life Through High Modulus Fiber Reinforcement of Adhesives", 20 National Sample, April 1975. This article does not relate to structural components in the form of proper laminates, but only to experiments concerning joining the adjacent edges of two basic titanium metal sheets or plates. The resulting joint is of the double lap or double strip type, i.e., the edges of the metal sheets are covered on both sides with a narrow strip. In FIG. 2 of the Klapprott article, a test specimen is shown in which two relatively thick (0.050 inches = 1.27 mm) metal sheets are joined by two narrow composite strips (thickness also 0.050 inches = 1.27 mm) covering the upper and lower sides of the adjacent edges of the two metal sheets or plates. The two strips are composites, i.e., an epoxy resin matrix reinforced with fibers. These two composite strips are secured to the metal sheets by the adhesive action of the epoxy resin matrix, as a result of which the ends of the two metal sheets are attached to each other. The Klapprott et al article is particularly concerned with experiments in which use is made of composites which are reinforced with high modulus fibers. The Klapprott article primarily demonstrates that the fatigue life of double lap type joints between two metal sheets is improved by using composite strips formed by high modulus fiber-reinforced adhesives.

I claim:

1. A fiber-reinforced, pre-stressed laminate adapted for use as a structural component of an air craft, comprising:

at least two sheets of an aluminum alloy, each of said sheets having a thickness in the range of 0.1 mm to less than 1 mm and a tensile strength of greater than 350 N/mm$^2$;

an adhesive layer located between each adjacent pair of said sheets, said adhesive layer comprising a thermohardening material disposed between the sheets to bond an adjacent pair of the sheets together;

aromatic polyamide fibers disposed in each said adhesive layer to reinforce the laminate, said fibers comprising poly-paraphenylene terephthalamide yarns made up of endless filaments formed from a material having a modulus of elasticity in the range of $5 \times 10^4$ to $25 \times 10^4$ N/mm$^2$ and an elongation at breakage of at least 2%, said yarns being disposed in substantially straight parallel lines in the adhesive layer and being present in an amount of 20 to 80% by weight based on the combined weight of the thermohardening material and the yarns, said laminate in an unloaded state having in its entirety a compressive stress of up to 300 N/mm$^2$ in each of the sheets and a tensile stress in each said adhesive layer, the thickness of each of the sheets being greater than the thickness of each said adhesive layer containing said fibers.

2. A laminate as claimed in claim 1, wherein the thickness of each of the sheets is in the range of 0.1 to 0.7 mm.

3. A laminate as claimed in claim 2, wherein the thickness of each of the sheets is in the range of 0.3 to 0.6 mm.

4. A laminate as claimed in claim 1, wherein the compressive stress in each of the sheets is up to 200 N/mm$^2$.

5. A laminate as claimed in claim 1, wherein the yarns are arranged in one or more groups.

6. A laminate as claimed in claim 1, wherein the yarns are in the form of a woven fabric.

7. A laminate as claimed in claim 6, wherein the woven fabric has 7 to 11 yarns per cm, each of said yarns having a linear density in the range of decitex 1200–2000 and containing 750–1250 filaments.

8. A laminate as claimed in claim 7, wherein the woven fabric has 9 yarns per cm, each of said yarns having a linear density of approximately decitex 1610 and containing approximately 1000 filaments.

9. A laminate as claimed in claim 1, wherein the laminate includes at least three sheets.

10. A laminate as claimed in claim 1, wherein each of the sheets comprises a sheet of an aluminum-copper alloy.

11. A laminate as claimed in claim 10, wherein the aluminum-copper alloy is of the type AA (USA) No. 2024-T$_3$.

12. A laminate as claimed in claim 1, wherein each of the sheets comprises a sheet of an aluminum-zinc alloy.

13. A laminate as claimed in claim 12, wherein the aluminum-zinc alloy is of the type AA (USA) No. 7075-T$_6$.

14. A laminate as claimed in claim 1, wherein the yarns are present in each said adhesive layer in an amount of 45 to 55% by weight based on the combined weight of the thermohardening material and the yarns.

15. A laminate as claimed in claim 1, wherein the filaments are formed from a material having a modulus of elasticity in the range of from $10 \times 10^4$ to $15 \times 10^4$ N/mm$^2$.

16. A laminate as claimed in claim 1, characterized in that the crack propagation rate of the laminate in millimeters per cycle of varying load is at least two times less than the crack propagation rate seen when the laminate is not reinforced with fibers, and in that the number of varying load cycles before breakage is at least two times greater than the number of varying load cycles prior to breakage seen when the laminate is not reinforced with fibers.

17. A process for making the laminate of claim 1, comprising:
providing a fiber-containing adhesive layer between each adjacent pair of sheets to bond the sheets together, thereby forming a laminate structure; and
applying an external tensile force to the laminate to impart a specific elongation to the entire laminate that is greater than the specific elastic elongation of the sheets and less than the specific elongation at breakage of the fibers and of the sheets.

18. A process as claimed in claim 17, wherein the sheets are subjected to plastic deformation during application of the external tensile force to the laminate.

19. A process as claimed in claim 17, wherein the specific elongation imparted to the laminate is in the range of 0.2 to 1.8%.

20. A process as claimed in claim 19, wherein the specific elongation imparted to the laminate is approximately 0.6%.

21. A process for making the laminate of claim 1, comprising:
providing a fiber-containing adhesive layer between each adjacent pair of sheets to bond the sheets together, thereby forming a laminate structure; and
applying an external tensile force to the fibers contained in each said adhesive layer to bring about a specific elongation less than the elongation at breakage of the fibers;
curing the adhesive layer while maintaining the application of external tensile force to the fibers; and
removing the external tensile force upon completion of the curing step,
whereby said laminate has a compressive stress in each of the metal sheets and a residual tensile stress in the fibers contained in each said adhesive layer.

22. A process as claimed in claim 21, characterized in that the sheets are not subjected to plastic deformation.

* * * * *